Feb. 6, 1934.  J. CEBULSKI  1,946,129
NOISELESS PROPELLER BLADE FOR AIRCRAFT
Filed Oct. 3, 1933
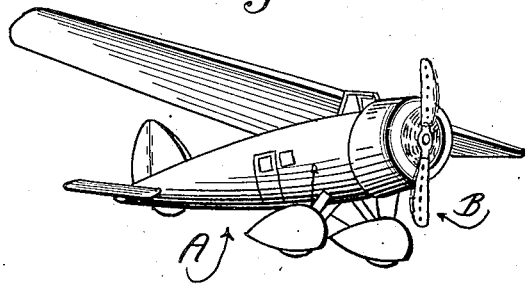
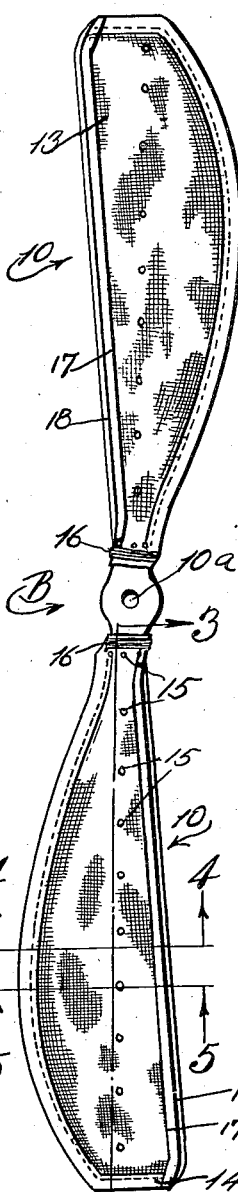
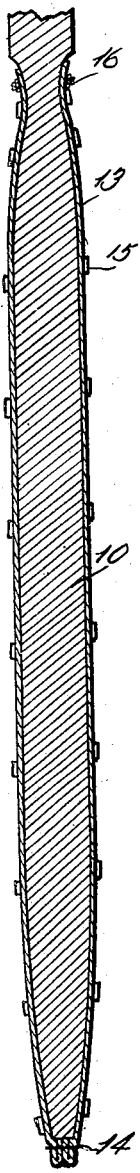
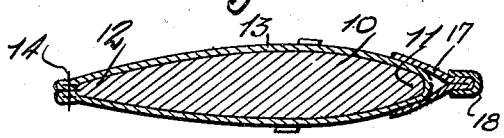
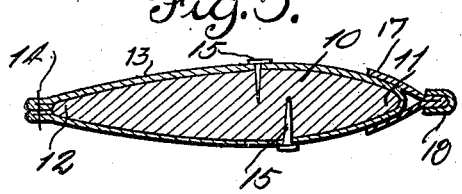
Inventor
Joseph Cebulski.
By Bryant & Lowry
Attorneys Patented Feb. 6, 1934

1,946,129

UNITED STATES PATENT OFFICE 1,946,129

NOISELESS PROPELLER BLADE FOR AIRCRAFT

Joseph Cebulski, Salem, Mass.

Application October 3, 1933. Serial No. 692,016

1 Claim. (Cl. 170—159)

This invention relates to certain new and useful improvements in noiseless propeller blades for aircraft.

The primary object of the invention is to provide means for silencing the propeller of aircraft by eliminating the whir or buzzing sounds of a rotating propeller so that the approach of aircraft can only be detected by sight, being especially serviceable during wars and less trying on the nerves of pilots and passengers.

More especially, the invention relates to an attachment for the propeller of an aircraft in the form of a fabric covering for the blades of the propeller for eliminating the whir or buzzing noise incident to rotation of a propeller.

A further object of the invention resides in the provision of a relatively thin reinforcing metallic strip on the leading edges of the propeller blades for the protection of the fabric covering.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a perspective view of an aircraft equipped with a fabric covered propeller for silencing the noise of the propeller;

Figure 2 is an enlarged plan view of the propeller showing the fabric covering upon the blades thereof;

Figure 3 is an enlarged fragmentary longitudinal sectional view taken on line 3—3 of Figure 2;

Figure 4 is a cross-sectional view taken on line 4—4 of Figure 2 showing the fabric sheet stitched together at the trailing edge of the propeller blade; and Figure 5 is a cross-sectional view taken on line 5—5 of Figure 2, showing additional pin anchor means for the fabric sheet or covering.

In aircraft, there is an objectionable whirring or buzzing noise incident to the operation of the propeller which constitutes a tell-tale of the approach of aircraft as well as wearing on the nerves of a pilot and passengers and this objectionable noise is eliminated by the provision of a fabric covering for the blades of the aircraft propeller, the aircraft being practically silent in its operation. In the accompanying drawing, there is illustrated an aircraft A provided with the usual forwardly positioned propeller B.

The propeller B comprises a pair of blades 10 of the usual stream line design having the widened leading edge 11 and narrow trailing edge 12. Each blade 10 is provided with a fabric covering 13 completely enclosing the same, the fabric covering being formed of a sheet of material folded around the blade with the edges of the fabric covering located at the trailing edge 12 and outer end of the blade, the free edges of the fabric covering being folded inwardly and stitched together as at 14 at the trailing and outer edges of the blade. Intermediate portions of the fabric covering 13 are anchored to the blade 10 by the means of pins 15 to prevent creeping movement and to further anchor the covering in position upon the blade, the inner ends thereof adjacent the propeller pivot 10a are bound by a wound cord 16. If desired, the pins 15 may have the heads thereof counter-sunk in the fabric covering 13.

To protect the fabric on the leading edges of the propeller blades 10, a thin metallic strip 17 encloses the leading edge and is capped by a second relatively thin metallic strip 18 for reinforcement, the metallic strips being secured in any suitable manner to the propeller blades. It will be understood from an inspection of Figs. 4 and 5, that the metallic strip 17 shown to be of substantially V-shape in cross-section has its side portions intimately engaged with the opposite faces of the propeller blade adjacent its leading edge and offers protection for the fabric covering where the same is subjected to the greatest amount of wear. The metallic strip 17 further aids in retaining the fabric covering 13 on the blade 10 and the cap strip 18 engaged with the projecting edge of the strip 17 imparts a clamping action to the strip 17 to effect a more secure connection between the strip 17 and the blade 10.

The fabric covering 13 may have a soft nap outer surface for the absorption of whirring or buzzing noises during rotation of the propeller, resulting in the silencing of the propeller when in service. While the fabric covering is illustrated as being attached to the propeller blade by means of pins, stitching and the like, it is to be understood that such showing may be modified to meet required conditions of service and other methods of attachment may be employed. The gist of the present invention relates to covering of an airplane propeller blade with the fabric having a soft nap surface and the protection of the fabric covering at the leading edge of the blade by a particular character of reinforcing metallic strip.

From the above detailed description of the invention, it is believed that the construction

I claim:—

A noise silencer for aircraft propellers comprising a fabric covering for the blades of a propeller and having a soft outer nap surface, and a pair of interfitting relatively thin metallic strips on the leading edges of the blades for protection of the fabric covering, the inner metallic strip being of substantially V-shape with the sides thereof intimately contacting the fabric and its forward edge terminating forwardly of the leading edge of the propeller blade and the outer metallic strip being capped on the projecting edge of the inner strip to aid in holding the latter engaged with the leading edge of the propeller blade.

his
    JOSEPH X CEBULSKI.
       mark

In presence of:
 JAMES E. FARLEY.